(12) United States Patent
Barkesseh et al.

(10) Patent No.: US 6,208,919 B1
(45) Date of Patent: Mar. 27, 2001

(54) VEHICLE DATA ACQUISITION AND ANALYSIS SYSTEM

(75) Inventors: Nasser M. Barkesseh, Ypsilanti; William J. Perzanowski, Troy, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/406,277

(22) Filed: Sep. 24, 1999

(51) Int. Cl.[7] .................................................. F02D 35/02
(52) U.S. Cl. ................................ 701/35; 701/29; 701/33; 73/116
(58) Field of Search .............................. 701/35, 29, 33, 701/101; 73/116

(56) References Cited

U.S. PATENT DOCUMENTS

| | | | |
|---|---|---|---|
| 4,137,562 | 1/1979 | Boeck et al. | 710/53 |
| 4,450,728 | 5/1984 | D'Angelo et al. | 73/862.28 |
| 4,630,043 | 12/1986 | Haubner et al. | 340/825.57 |
| 4,922,443 | 5/1990 | Coetsier et al. | 702/188 |
| 5,400,246 | 3/1995 | Wilson et al. | 700/17 |
| 5,416,703 | 5/1995 | Gruler et al. | 701/1 |
| 5,428,357 | 6/1995 | Haab et al. | 341/155 |
| 5,486,995 | 1/1996 | Krist et al. | 700/29 |
| 5,623,412 | * 4/1997 | Masson et al. | 364/431.03 |
| 5,638,299 | 6/1997 | Miller | 702/127 |
| 5,734,569 | 3/1998 | Rogers et al. | 701/33 |

* cited by examiner

Primary Examiner—William A. Cuchlinski, Jr.
Assistant Examiner—Arthur D. Donnelly
(74) Attorney, Agent, or Firm—Marc Lorelli

(57) ABSTRACT

A vehicle data acquisition and analysis system which acquires digital and analog input signals and analyzes information relating to vehicle component operation characteristics. A digital acquisition card is connected to at least one vehicle component to acquire a digital input signal data, and an analog acquisition card is connected to at least one vehicle component to acquire an analog input signal data. A connector (e.g., a bus) that provides a connection between the digital and analog cards synchronizes the digital and analog data acquisition when the acquisition of one card triggers the acquisition of the other card. The synchronized data is further processed upon the user's request to display the related vehicle characteristics.

9 Claims, 5 Drawing Sheets

VEHICLE DATA ACQUISITION AND ANALYSIS SYSTEM

BACKGROUND OF THE INVENTION

Field of the Invention

The present invention relates generally to vehicle data acquisition systems, and more particularly, to vehicle data acquisition systems for acquiring information relating to vehicle operation characteristics.

BACKGROUND AND SUMMARY OF THE INVENTION

Presently, the automotive industry utilizes data acquisition and analysis in order to optimize vehicle performance. Conventional vehicle data acquisition and analysis employ stripchart recorders, such as, the Visicorder and Astromed stripchart recorders (which systems are respectively available from Honeywell® and Astromed®).

However, strip recorders typically do not have the capability to efficiently and easily produce and store data signals. Moreover, these approaches typically only include a limited number of channels (i.e., independent variables) which can be recorded. They also experience a limited ability for comparison on a graph multiple channels which have the same or different unit types and experience the inability to use computer analysis methods such as FFT (fast Fourier transform), and statistical analysis as well as being limited with respect to channel analysis. The inability to simultaneously acquire and analyze both digital and analog data having different sampling rates results in more processing steps and thus higher cost.

The present invention overcomes the aforementioned disadvantages as well as other disadvantages. In accordance with the teachings of the present invention, a component based in-vehicle data acquisition and analysis method and apparatus is provided for assisting users (such as calibrators) to examine their tuned engine parameters. The data acquisition unit provides different modes of acquisitions such as triggering data when an event happens and gathering data for a fixed buffer either one time or continuously. The present invention has a particular use for acquiring digital and analog data with different sampling rates. The acquisition of input data signals are done simultaneously by synchronizing digital and analog input data signals via a Real Time System Integration bus. The data processing unit is provided for calculating and analyzing the acquired data, and displaying the result for the users.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The invention being thus described, it will be obvious that the same may be varied in many ways. Such variations are not to be regarded as a departure from the spirit and scope of the invention, and all such modifications as would be obvious to one skilled in the art are intended to be indicated within the scope of the following claims.

Figure 1:
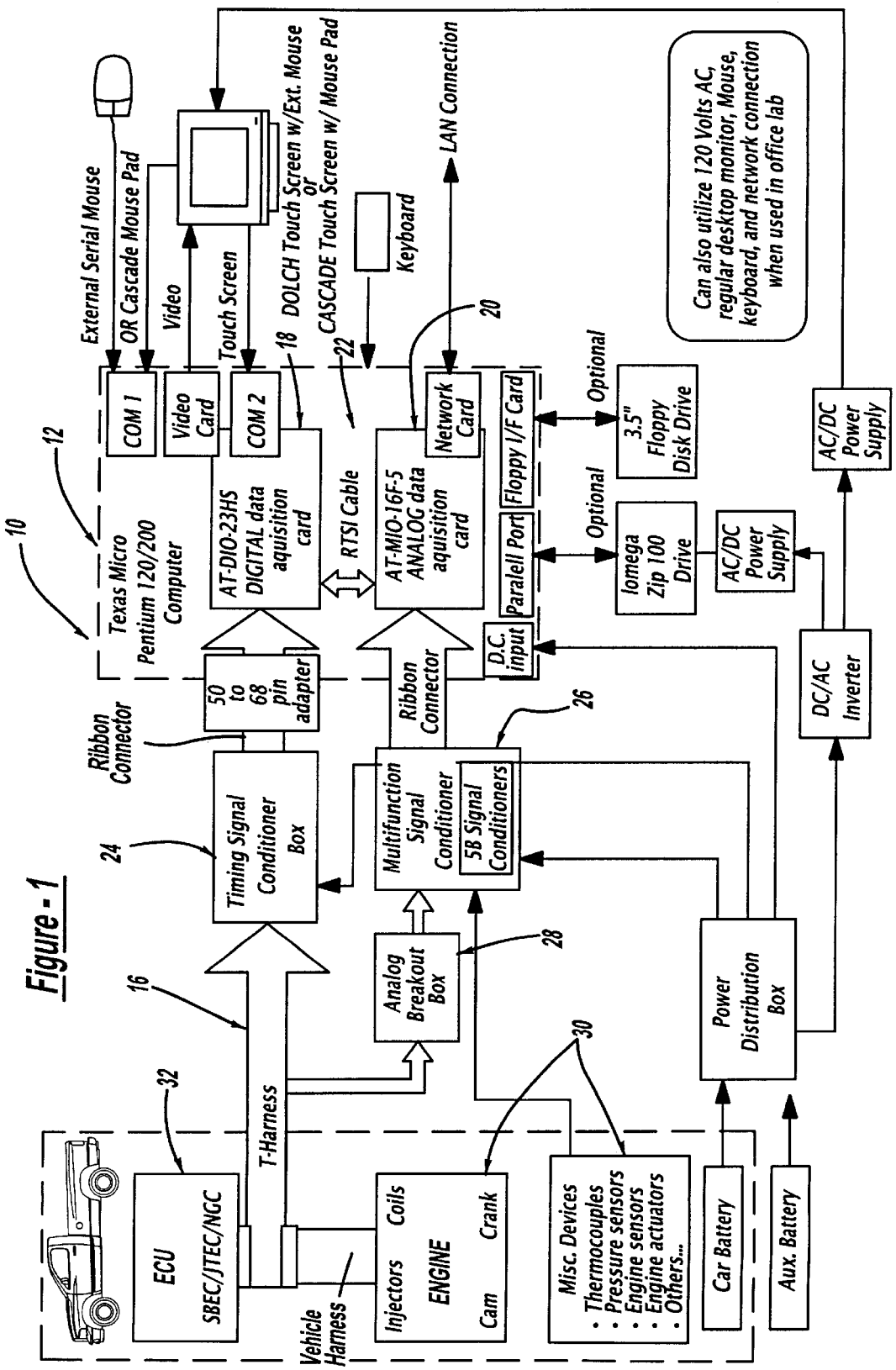
FIG. 1 is a block diagram depicting the vehicle data acquisition system of the present invention.

FIG. 1 is a hardware block diagram that depicts the vehicle data acquisition system 10 that acquires information relating to vehicle component operation characteristics. In the preferred embodiment, the vehicle data acquisition system 10 acquires digital and analog data with different sampling rates simultaneously and analyzes the acquired data including for transient conditions of the vehicle engine operation. The vehicle data acquisition system 10 includes a T-Harness cable 16 to access the engine controller unit 32 signals, a timing signal conditioning box 24 to condition the digital portion of signals in the form of TTL signals (i.e., 0 volts to 5 volts) which are readable by computer, an analog breakout box 28 to strip out the available analog signals from unit 32 signals, a multifunction signal conditioning 26 to amplify analog signals which are furnished by either analog breakout box 28 or directly from the vehicle components 30, a Texas Micro 12 which includes AT-DIO-32HS 18 and AT-MIO-16F-5 20 (National Instrument data acquisition cards) and a RTSI connection cable 22 to connect the digital and analog acquisition control signals, and finally a number of supporting devices such as monitor, keyboard and power supply for user interface to computer.

The ECU 32 is connected to the digital timing signal conditioner box 24 and the analog breakout box 28 by a T-Harness cable connector. The analog breakout box 28 is connected to the analog multifunction signal conditioner 26 via connector cables. Both the analog multifunction signal conditioner 26 and the digital timing signal conditioner further includes a number of amplifiers or other equivalent electronic devices to generate an amplified signals within the range of computer reachable voltage to the data acquisition unit 12.

The data acquisition unit 12 includes a digital data acquisition card 18 for receiving digital data input signals, an analog data acquisition card 20 for receiving analog input data signals, and a Real Time System Integration (RTSI) bus 22 for synchronizing the input data signals.

In this preferred embodiment, a Texas Micro Personal Computer (PC) having a Pentium processor (120 or 200 MHz) and at least 48 megabytes of memory are used in the data acquisition unit 12. A full size National Instrument (NI) digital card 40 such as AT-DIO-32HS is used for the digital acquisition card, and an Industry Standard Architecture ISA) analog card such as AT-MIO-16F-5 is used as the analog data acquisition card.

The data acquisition unit 12 has particular use for acquiring digital and analog input data signals with different sampling rates. Upon receipt of an input data signal by one of the data acquisition cards 18 and 20, the RTSI bus ribbon cable 22 passes a trigger signal to the other data acquisition card, thereby starting the synchronization of the input data signal. In the case of using different computer architecture such as PXI versus ISA systems of the preferred embodiment, the RTSI bus connection 22 is internal and there is no need for physical cable connection. The acquisition task covers such modes of acquisitions as triggering data acquisition when an event happens and gathering data for a fixed buffer either one time or continuously. The analog and digital data display information relating to vehicle component operation characteristics.

The present invention has, for example, use for engine calibrators to display control timing signals while calibrating engine controller software. The present invention in this application displays a set of engine timing signals for injectors, ignition coils, and the like. The calculated data may then be saved for further analysis.

Figure 2:
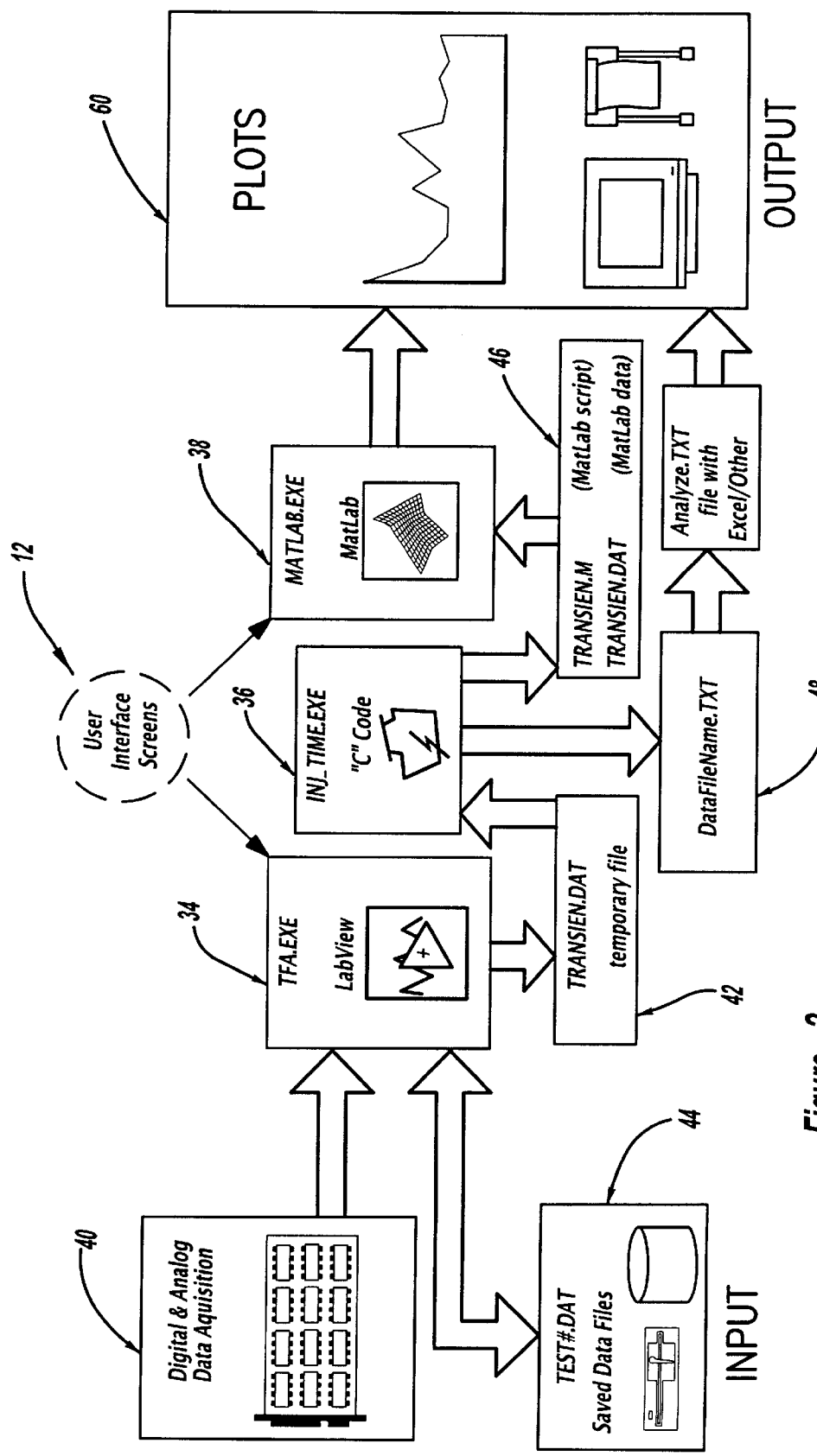
FIG. 2 is a block diagram depicting the vehicle data acquisition software of the present invention.

FIG. 2 is a software block diagram that depicts the computer based in-vehicle data acquisition system 12 which performs post-processing, calculation, displaying, and storing the input data from the various components of a vehicle. The preferred embodiment uses mainly three different items of software: Labview, Matlab and C language programs. After the data acquisition cards 40 have acquired the input data signals, the input data signals are transferred to a computer for further processing.

A Labview program 34 is used for data acquisition, data transfer and front end user interfaces. The data acquisition can be performed in three different modes, which are single buffer, continuous buffer and triggering buffer modes depending on the user preferences. The single buffer mode is for acquiring a digital and analog data signal at one instance. The continuous buffer mode is for acquiring input data signals for a given period of time continuously. The triggering buffer mode is for acquiring digital and analog data by triggering either the digital or analog acquisition cards 18 and 20, which has received the other card's input data signals via the RTSI bus 22.

The Labview program 34 receives thirty-two signals including timing signals from the NI digital data acquisition card 18 of FIG. 1. For example, the timing signals can include injector pulses, ignition pulses for multiple cylinders, crank pulses and cam pulses. It also receives up to sixteen analog channels from the NI analog data acquisition card 20 of FIG. 1. The acquisition rate may be set up to 50 kHz for thirty two of digital data and up to 2 kHz for all 16 analog channels. The acquisition buffer is also assumed to be in the range of 10 seconds. These settings are dependent on the processor speed and computer Random Access Memory (RAM). The acquired data is saved in a data file 44 on the computer hard drive or saved in a temporary file 42 in order to be sent for post-processing.

In the case of post-processing, the acquired data is passed to a C language program 36 for calculations and displaying purposes. Upon the user's request, the C language program 36 calculates vehicle parameters such as cylinder fuel consumption, cylinder coil electric charge time, engine speed, and cylinder position (in degrees) with respect to a reference angle defined by the engine controller type. The calculated information is saved in a data file 48 for further processing. The C language program 36 also generates a Matlab script file 46, and finally launches a Matlab program 38 for displaying acquired and calculated data 50.

Figure 3:
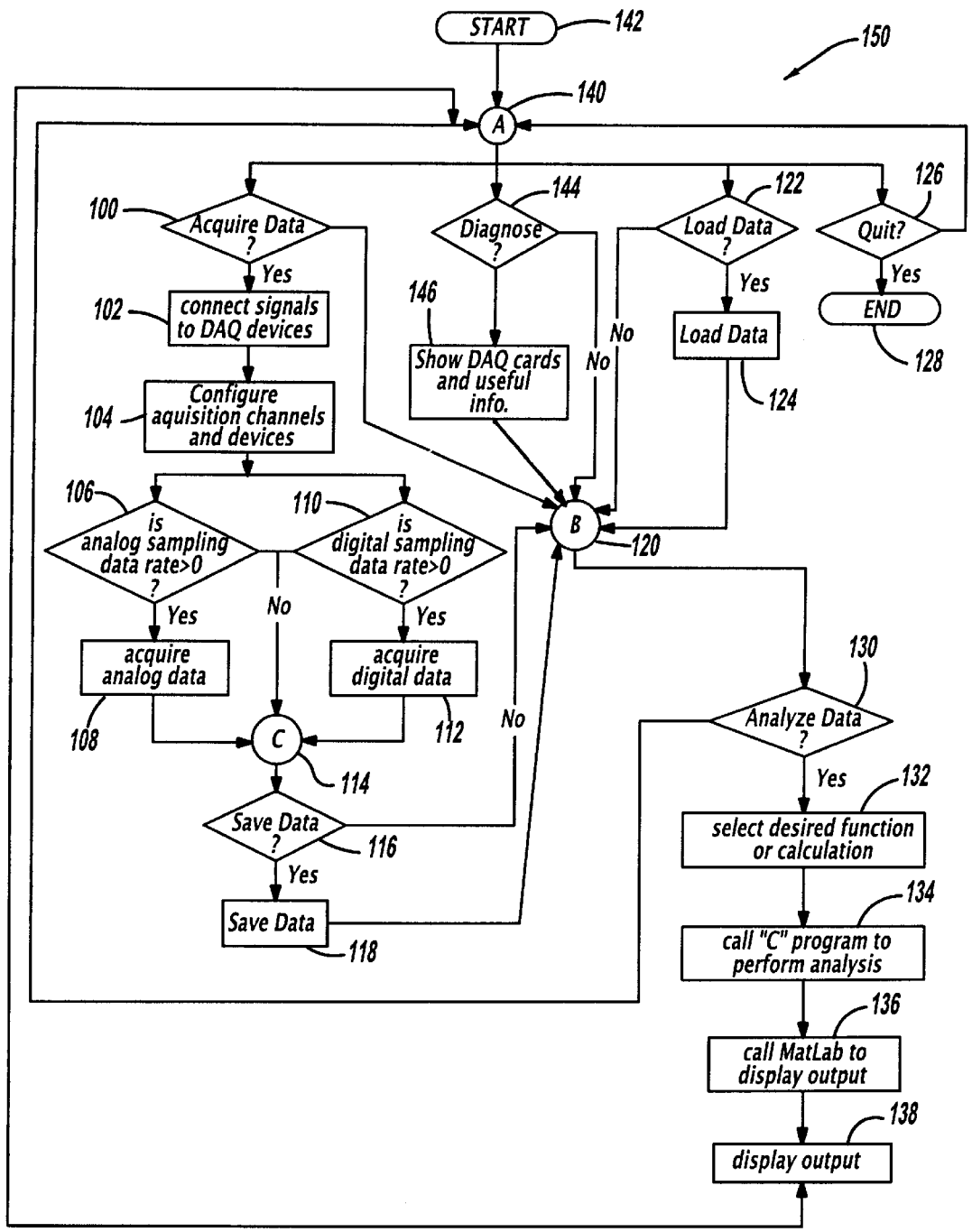
FIG. 3 is a flow chart depicting the acquisition and analysis of the vehicle component characteristics within the system of the present invention.

FIG. 3 is a process flow diagram that depicts the data acquisition and analysis performed with goes through three decision blocks 100, 122, and 126 in which the user can request whether to acquire new data signals at decision block 100, to load stored data at decision block 122, or to exit the system at decision block 126.

When the user selects to exit the current process loop, the process 150 terminates the current process and goes back to the first junction point A 140. When the user selects to load stored data, then a load process at process block 124 is executed wherein the stored data is retrieved and is available for post-processing analysis. After loading the data, it enters a second junction point B 120 and waits for the next step.

When the user selects to acquire new data signals at the decision block 100, the process 150 goes to process step 102 to verify for the connectivity of signals to DAQ (data acquisition) devices. The process step 104 is then carried out to configure the acquisition channels and devices. Depending on the user request, the process 150 checks whether both analog and digital input signals have sampling rates that are greater than zero at decision blocks 106 and 110. If the analog sampling rate determined at the decision block 106 is greater than zero, the process 150 acquires the analog input data signals at process step 108. If the digital sampling rate determined at the decision block 110 is greater than zero, the process 150 acquires the digital input data signals at process step 112. When both digital and analog signals have sampling rates greater than zero, the internal synchronization is performed via the RTSI bus 22 of FIG. 1. After the input data signals are acquired, the process 150 goes to a third junction point C 114. Decision block 116 confirms that the user decided to save the data at process step 118, and process 150 proceeds to the junction point B 120.

Junction point B 120 proceeds to a decision block 130 and confirms that the user wants to analyze the data. The user selects desired functions or calculations to be done at process step 132. The system invokes the C program to perform the desired calculation or analysis at process step 134. Process step 134 generates a data file to store its results, and Matlab script and data file to display its output. Once the C program generates the Matlab files, it launches a Matlab program to display its output at a process block 136 and the output is displayed on the user interface at process step 138. Process 150 then returns to the junction point A 140 and waits for the user to select the next task.

Figure 4:
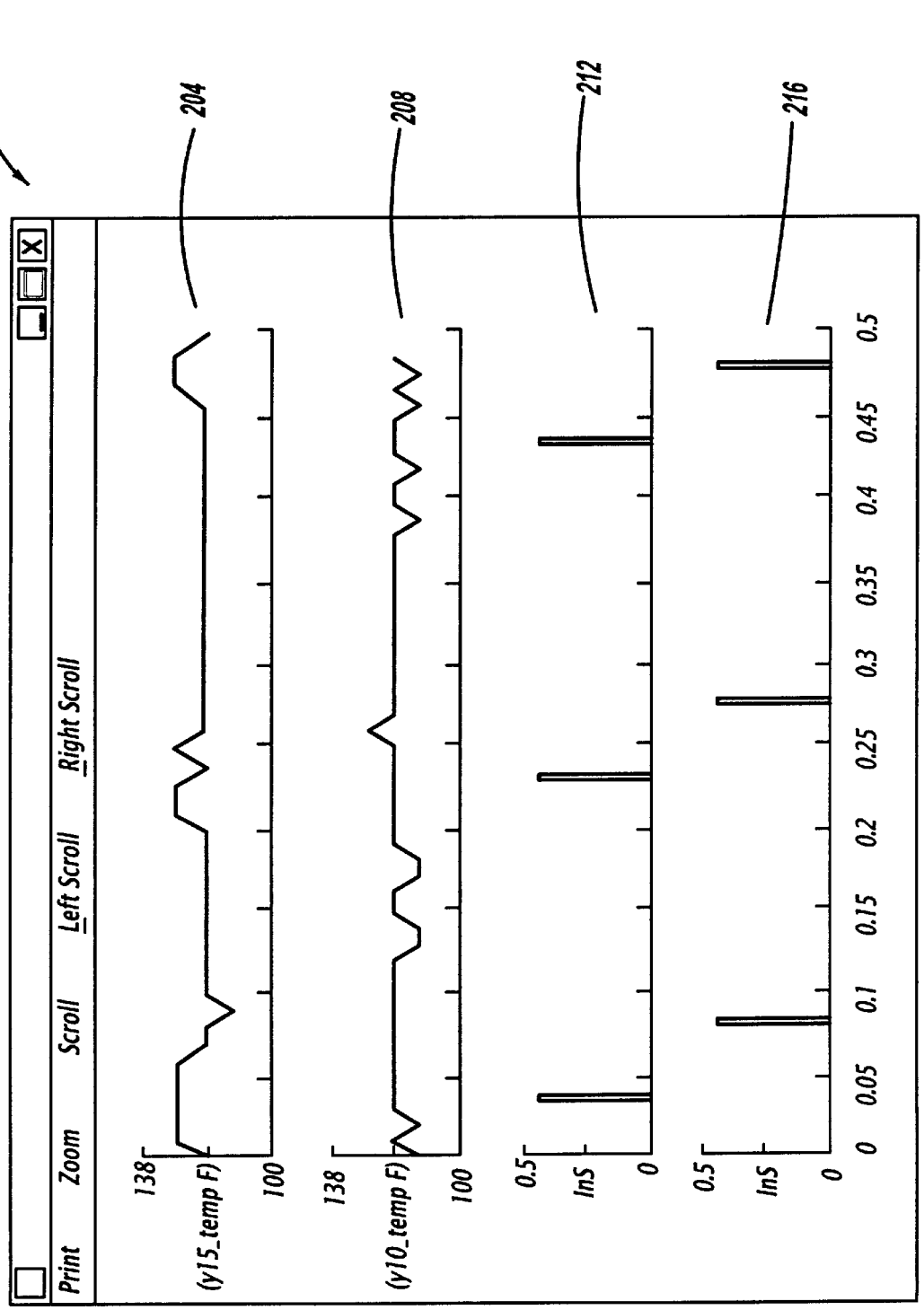
FIG. 4 is an x-y graph depicting an exemplary data acquisition and synchronization of digital and analog input data signals.

FIG. 4 depicts an exemplary display 200 of selected analog and digital channels being displayed by the present invention. FIG. 4 depicts two analog channels 204 and 208 and two digital channels 212 and 216. Analog channel data 204 and 208 represent temperature values of a cylinder and had a sampling rate of 1 kHz. Digital channel data 212 and 216 represent injector signals and had a sampling rate of 5 kHz.

The two analog channel data 204 and 208 were acquired substantially at the same time that the two digital channel data 212 and 216 were acquired. Due to this simultaneous acquisition, the present invention has an advantage of efficiently and effectively synchronizing analog channel data with digital channel data.

Figure 5:
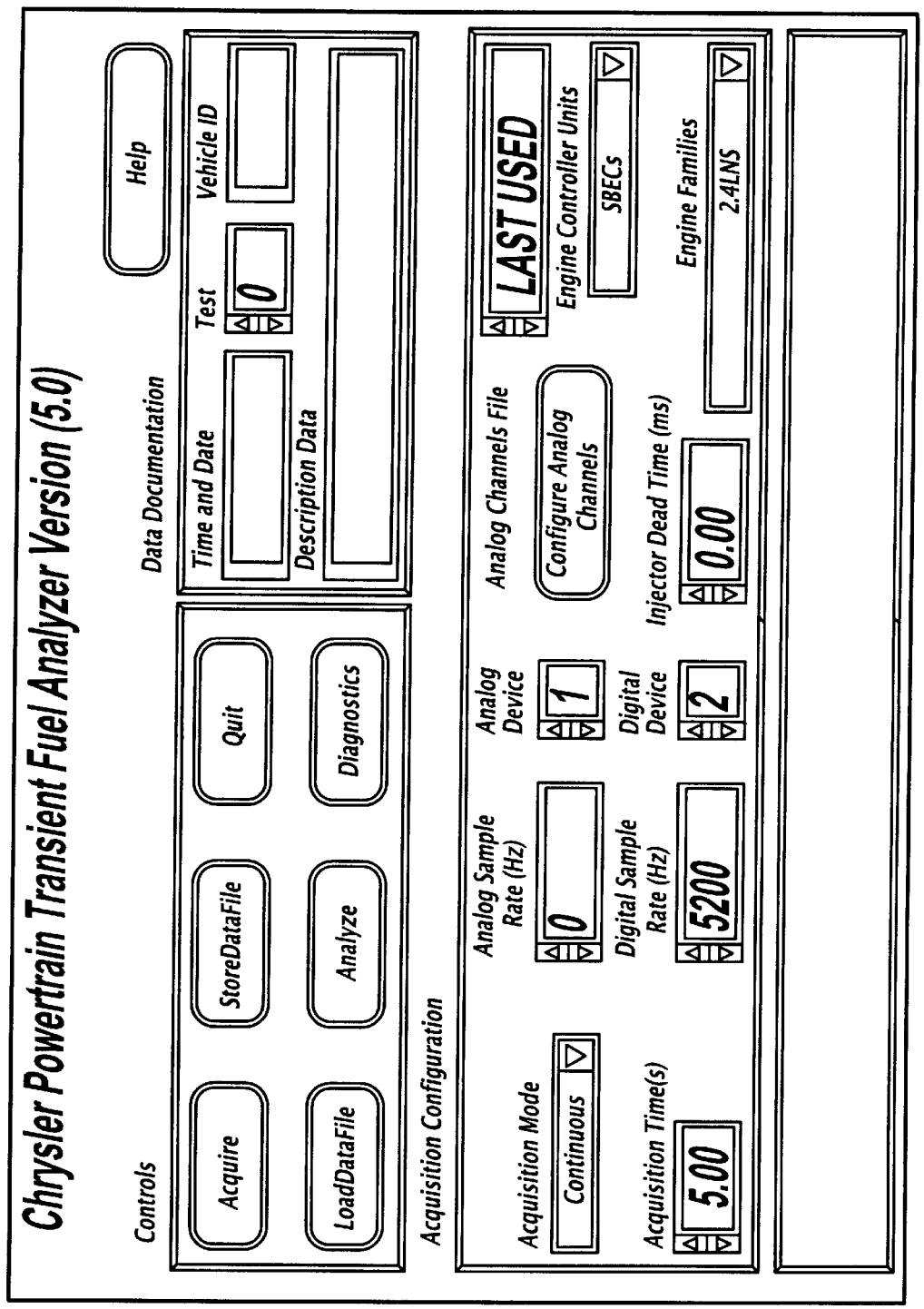
FIG. 5 is a computer screen display of the vehicle data acquisition software main menu.

FIG. 5 depicts the data acquisition system's main menu of the preferred embodiment. After the computer based in-vehicle data acquisition system 12 has executed, the main menu is displayed. Controls are used to define a task for the user. These controls include Acquire, Store Data File, Quit, Load Data File, Analyze, and Diagnostics. Acquisition configuration controls are also used to configure the acquisition mode. These controls include Acquisition Mode, Acquisition time, Analog Sample Rate, Digital Sample Rate, Analog Device, Digital Device and Configure Analog Channels. The remaining of Acquisition configuration controls, such as Injector Dead Time, Engine Controller Unit (ECU), and Engine Families are used for analysis purposes. Finally, Data Documentation controls such as Test, Vehicle ID and Description Data are used for file header information.

Diagnostic control 152 helps the user to look for any failure that there is within the acquisition cards. Help control gives the user the broader help topic relating to usage of the system 150.

Various other advantages of the present invention will become apparent to those skilled in the art after having the benefit of studying the foregoing text and drawings taken in conjunction with the following claims.

What is claimed is:

1. A vehicle data acquisition system for acquiring information relating to vehicle component operation characteristics, comprising:

a digital acquisition card connected to at least one vehicle component for acquiring a digital input signal;

an analog acquisition card connected to at least one vehicle component for acquiring an analog input signal; and a connector for providing a connection between the digital and analog cards for synchronizing the digital and analog data acquisitions;

wherein acquisition by one card triggers the acquisition of the other card, so that the acquisitions are synchronized.

2. The system of claim 1 wherein the digital input signal and the analog input signal have different sampling rates.

3. The system of claim 1 further comprising a data analysis computer program for receiving and processing the synchronized digital and analog data.

4. The system of claim 3 wherein the computer program analyzes the received synchronized digital and analog data for determining characteristics relating to the vehicle component operation.

5. The system of claim 1 wherein the acquisition of the digital input signal to the digital acquisition card triggers the analog input signal acquisition for the analog acquisition card such that the acquisitions are synchronized.

6. The system of claim 1 wherein the acquisition of the analog input signal to the analog acquisition card triggers the digital input signal acquisition for the digital acquisition card such that the acquisitions are synchronized.

7. The system of claim 1 wherein the vehicle component operation characteristics are selected from the group consisting of cylinder's fuel consumption, engine speed, cylinder's coil electric charge, cylinder's position in degree with respect to a reference angle, and combinations thereof.

8. The system of claim 1 further comprising a digital timing conditioning box connected to the digital card for processing the digital input signal from a controller unit to the digital card.

9. The system of claim 1 further comprising an analog signal conditioning box connected to the analog card for processing the analog input signal from the engine controller unit.

* * * * *